(No Model.)  3 Sheets—Sheet 1.
T. McKNIGHT.
CHILD'S CARRIAGE.
No. 292,933.  Patented Feb. 5, 1884.
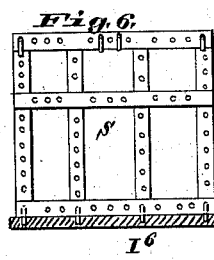
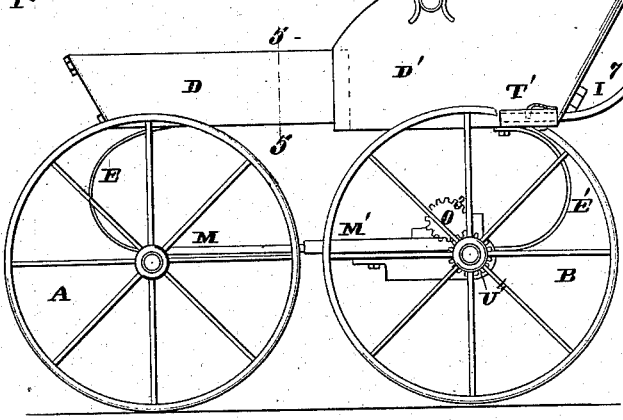
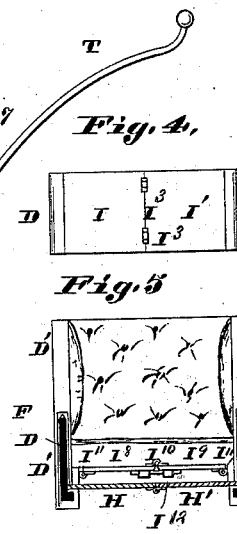
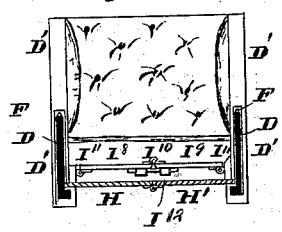
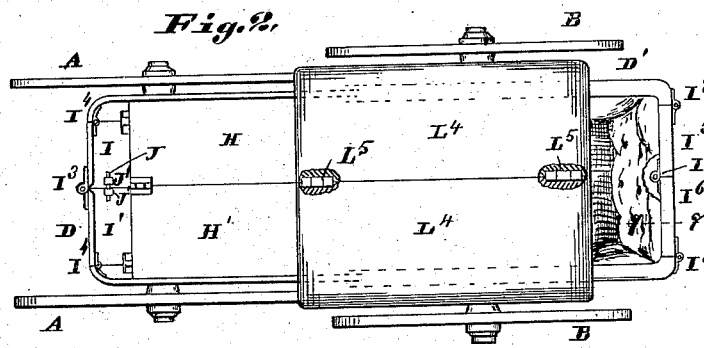
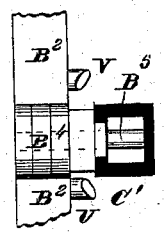
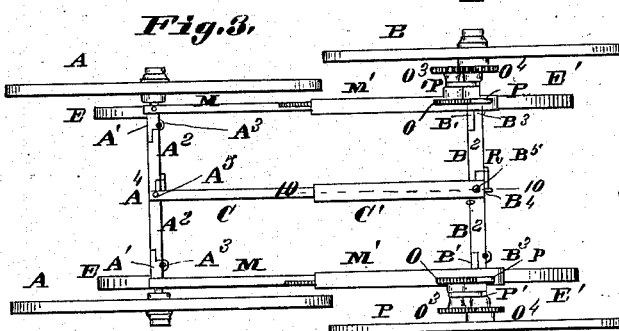
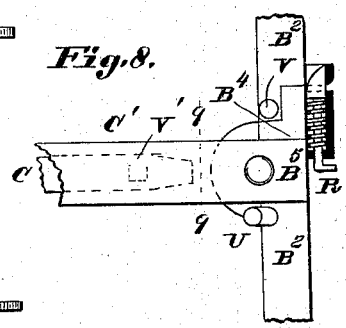
Attest:
Charles Rickles
Chas J. Tanner
Inventor:
Thomas McKnight
By Knight Bros attys
N. PETERS, Photo-Lithographer, Washington, D. C.

(No Model.) 3 Sheets—Sheet 2.
T. McKNIGHT.
CHILD'S CARRIAGE.
No. 292,933. Patented Feb. 5, 1884.
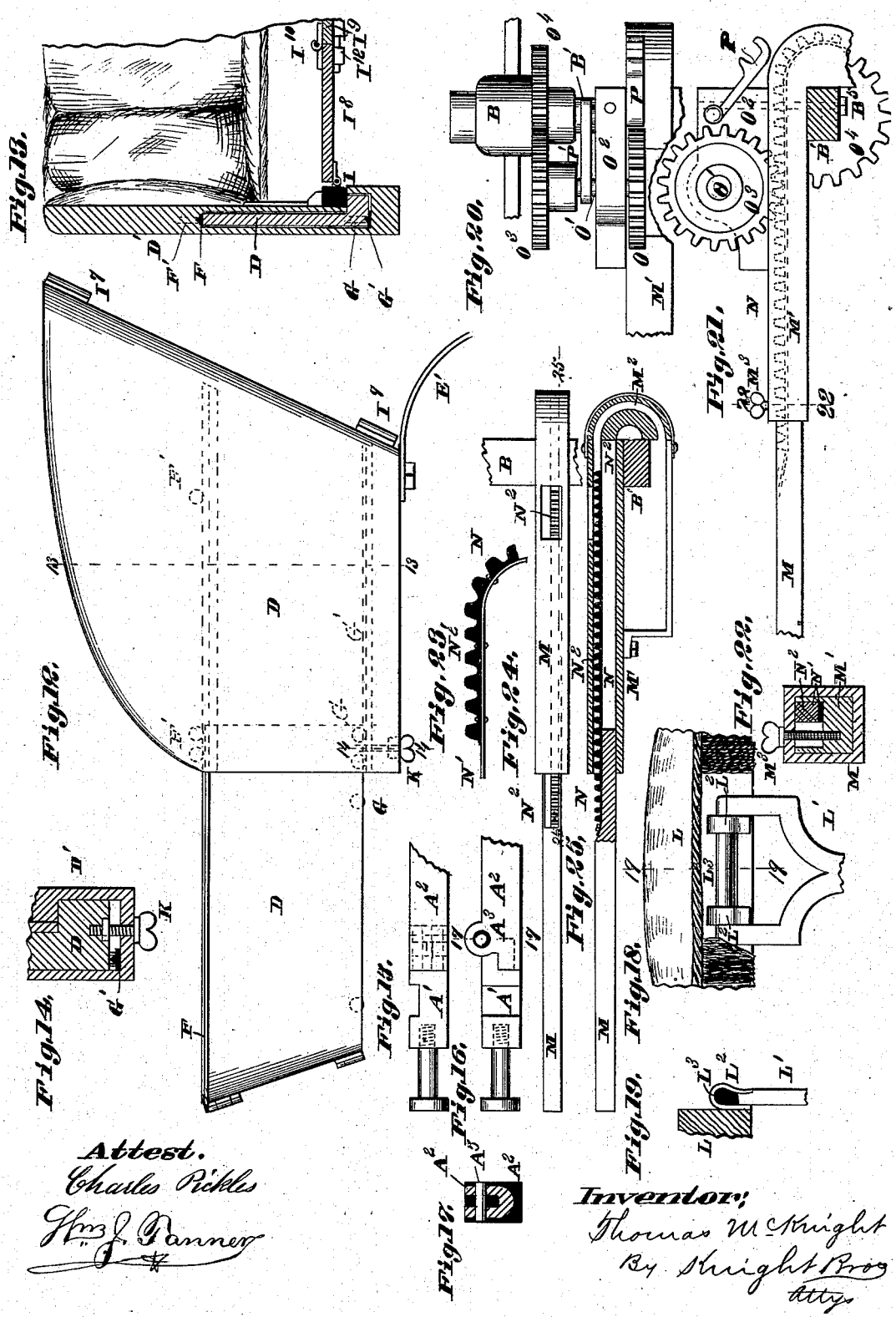
Attest.
Charles Pickles
Hmy J. Danner
Inventor;
Thomas McKnight
By Knight Bros
Attys (No Model.) 3 Sheets—Sheet 3.
T. McKNIGHT.
CHILD'S CARRIAGE.
No. 292,933. Patented Feb. 5, 1884.
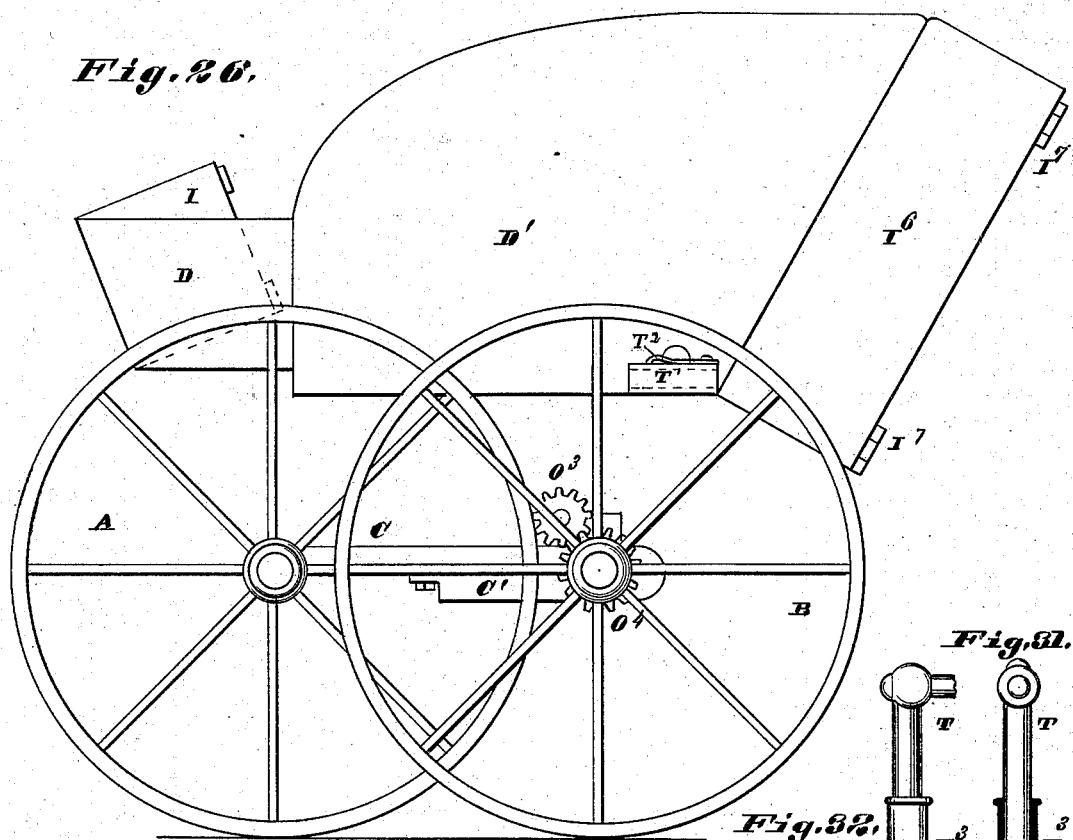
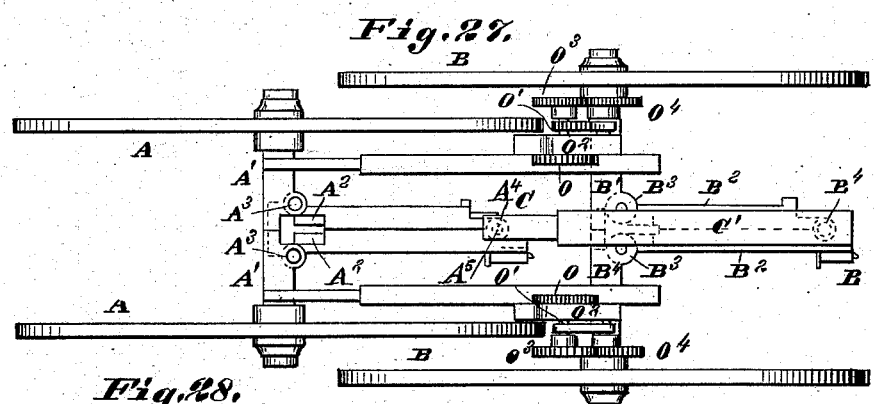
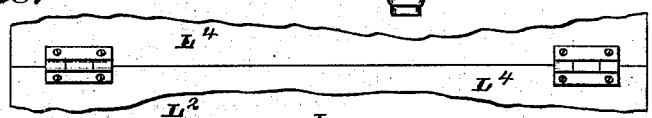
Attest:
Charles Pickles
Wm. J. Danner
Inventor:
Thomas McKnight
By Knight Bros
attys

UNITED STATES PATENT OFFICE.

THOMAS McKNIGHT, OF DENVER, COLORADO, ASSIGNOR OF ONE-HALF TO JAMES A. McGONIGLE, OF LEAVENWORTH, KANSAS.

CHILD'S CARRIAGE.

SPECIFICATION forming part of Letters Patent No. 292,933, dated February 5, 1884.

Application filed May 4, 1883. (No model.)

*To all whom it may concern:*

Be it known that I, THOMAS McKNIGHT, of Denver, in the county of Arapahoe and State of Colorado, have invented a certain new and useful Improvement in Children's Carriages, &c., of which the following is a full, clear, and exact description, reference being had to the accompanying drawings, forming part of this specification, and in which—
Figure 1 is a side elevation. Fig. 2 is a top view. Fig. 3 is a top view with the body removed. Fig. 4 is a front view of the body. Fig. 5 is a vertical transverse section of the body, taken on line 5 5, Fig. 1. Fig. 6 illustrates the manner of constructing the removable frame of the back. Fig. 7 is a vertical section taken on line 7 7, Fig. 2. Fig. 8 is an enlarged detail view of the rear axle and reach. Fig. 9 is a section taken on line 9 9, Fig. 8. Fig. 10 is a vertical longitudinal section taken on line 10 10, Fig. 3. Fig. 11 is a transverse section taken on line 11 11, Fig. 10. Fig. 12 is an enlarged side view of the body with the top removed. Fig. 13 is a vertical section taken on line 13 13, Fig. 12. Fig. 14 is a section on line 14 14, Fig. 12. Fig. 15 is a side view of the end of one of the axles. Fig. 16 is a top view of same. Fig. 17 is a section taken on line 17 17, Fig. 16. Fig. 18 is an enlarged detail side view of the top, part broken away. Fig. 19 is a section on line 19 19, Fig. 18. Fig. 20 is an enlarged top view of one of the rear wheel-hubs and the gearing connected therewith. Fig. 21 is an enlarged side view of the said gearing. Fig. 22 is a section taken on line 22 22, Fig. 21. Fig. 23 is an edge view of the flexible cog-rack. Fig. 24 is a top view of the side bars and racks. Fig. 25 is a section taken on line 25 25, Fig.
24. Fig. 26 is an enlarged side view of the carriage in its shipping condition. Fig. 27 is a top view of same with the body removed. Fig. 28 is a detail view of the hinged top of the carriage, and Fig. 29 is a section of same folded. Fig. 30 is a detail view illustrating a manner of locking the hinged parts together. Fig. 31 is a side view of the cross-bar of the handle of the carriage, showing the locking-sleeve in section; and Fig. 32 is a top view of same.

My invention relates to a child's carriage or buggy that can be easily, quickly, and conveniently changed from working or using position to a shipping position, so that it will take little or no unnecessary room while in storage or during transportation.

My invention consists in features of novelty hereinafter fully described, and pointed out in the claims.

Referring to the drawings, A represents the front and B the rear wheels of the vehicle. The axle of the front wheels consists of four parts, A' A' and $A^2$ $A^2$. The wheels are journaled on the outer ends of the parts A', (see Fig. 3,) and these parts are hinged to the parts $A^2$ at $A^3$, (see Figs. 3, 15, and 16,) the outer edges of the ends of the parts $A^2$ inclosing the ends of the parts A', (see Figs. 16 and 17,) to strengthen the joints. The adjacent ends of the parts $A^2$ are hinged together at $A^4$, the bolt $A^5$ forming the pivot, serving also to connect the front end of the reach to the axle. The rear axle consists of four parts, B' B' and $B^2$ $B^2$, arranged and connected together in the same manner as the parts of the front axle, $B^3$ $B^4$ representing, respectively, the hinges, and $B^5$ the bolt forming the pivot of the hinge $B^4$, and serving to connect the rear end of the reach to the axle.

The reach is made in two parts, C C', the former telescoping the latter when the carriage is changed from a using to a shipping condition. (See Figs. 3, 8, 10, 11, and 27.) The part C is secured to the front and the part C' to the rear axle. The part C' consists of a box with a loose bottom, $C^2$, hinged to the sides, (see Figs. 10 and 11,) for a purpose hereinafter stated. The back end of the part C has a hook, $C^3$, and spring-catch $C^4$, the object of which will also be mentioned.

The body is made in two parts, D D', D being the front part, which is secured to the front axle by springs E; (see Fig. 1,) and D' the back part, which is connected to the rear axle by springs E'. (See same figure.) When the carriage is to be folded up, the part D telescopes the part D'. (See Figs. 2, 12, and 26.) To cause the part D to move easily into the part D', I provide its upper edges with rails F, which bear beneath friction-rollers F', secured to the part D', (see Figs. 12 and 13,) and the bottom of the part D has friction-rollers G, which ride on rails G', secured to the part D'. (See same figures.) The sides only of the part D telescope the part D', as shown, for the bottom of the part D is removable, being made in two parts, H' H', hinged together. (See Fig. 2.) The front of the part D consists of two sections, I I', hinged together at I³ and to the sides at I⁴, and provided with a locking-pin, J, fitting in keepers J', (see Fig. 2,) to hold the parts rigid when in their working position. The back of the part D' consists of two sections, I⁵ I⁶, hinged together at I² and to the sides at I⁷, and the bottom of the part D' consists of two parts, I⁸ I⁹, hinged together at I¹⁰ and to the sides at I¹¹. (See Figs. 5 and 13.) When the parts are opened out, they are held in that position by a set-screw, K. (See Figs. 12 and 14.)

L represents the top of the carriage, supported on braces L', (see Fig. 1,) and connected therewith by spring-catches L² on the top, hooking over rods L³ of the braces. (See Figs. 18 and 19.) The top can thus be easily removed from the braces, and it preferably consists of strips L⁴, secured together by hinges L⁵, (see Fig. 2,) suitably covered.

M represents side bars secured to the front axle, and telescoping, when the carriage is folded up, tubes or boxes M', secured to the rear axle, and which their free ends enter. (See Figs. 24, 25.)

Secured to the free ends of the bars M are flexible cog-racks N, consisting of steel strips N' and sections N² of cogs riveted thereto. As the bars M are drawn back, the flexible racks retreat through a channel, M², (see Fig. 25,) around and beneath the rear axle. When the bars M are pulled out, they are held in that position by set-screws M³. (See Figs. 21 and 22.) The racks are operated to pull the bars M into the boxes M' by cog-wheels O, meshing therein, rigidly secured to the inner ends of short shafts O', journaled in blocks O², supported by the rear axle. On the outer ends of the shafts O' are cog-wheels O³, which engage with similar wheels, O⁴, on the hubs of the rear wheels. (See Figs. 20 and 21.) Thus the necessary power required to fold the carriage up is derived, or at least may be derived, from the rear wheels. When the carriage is in use, the shafts O' are shifted inward, to disengage the cog-wheels O O³ from the cog-wheels O⁴ and racks N, and are held in this position by dogs P, (see Figs. 20, 21,) and the cog-wheels are held into working position by dogs P'. (See Fig. 20.) The dogs are pivoted to the opposite sides of the blocks O², and their free ends simply engage over the shaft when they are thrown forward, for the purpose stated.

Supposing the carriage to be in using position and it is desired to fold it up, the operation is as follows: First shift the shaft O' to bring the cog-wheels and racks into engagement, as described, and then loosen the set-screws M³ K and the locking-pin J, and also the locking-pin I¹², for strengthening the two parts of the bottom of the body. (See Figs. 2 and 30.) Next the top is removed, and then sufficient power applied to the rear wheels to operate the gearing, which of course commences at once to shorten the carriage up by telescoping the various parts, as described, and almost immediately after the parts begin to telescope the rear end of the part C of the reach comes against the end of the pivoted bottom C², which is made to stick up into the box, as shown in Fig. 10, by means of a spring, Q, and carries it back, which is allowed by its supporting-pin C⁷ passing through a slot, as shown, causing its rear end to strike the rear axle at its center, causing the two parts of the axle to fold together, as shown in Fig. 27. If the rear axle is strengthened by a spring-catch, R, as shown in Fig. 8, which I prefer to do, the catch of course would have to be pulled back before the axle would fold. As the rear axle is thus being folded, the sides of the body of the carriage are folded together by taking out the locking-pin J, as stated, removing the bottom of the part D and the frame S, to which the back cushion is secured, and which is held against the back by means of suitable hooks, to strengthen it, (see Figs. 6 and 7,) and folding the bottom of the part D' downward, and the back and front into the position shown in Fig. 26, the handle T having been removed, it being held in sockets T' by suitable springs, T². (See Fig. 26.) When the handle is removed, it can be folded by having its cross-bar hinged and connected, when in use, by a sliding slotted sleeve, T³. (See Figs. 31 and 32.) Just as the folding of the rear axle is about completed, a pin, U, having an inclined face, (see Figs. 8 and 9,) on one of the parts B² of the rear axle comes against the inclined end (see Fig. 10) of the hinged bottom C², and raises this end of the bottom, lowering the front end, and allowing the part C of the reach to be drawn within the part C', and the parts A² of the front axle are then folded together. (See Fig. 27.) As the folding of the rear axle is completed, a pin, V, on the opposite part B², to which the pin U is secured, (see Figs. 8 and 9,) engages or enters a notch, V', in the end of the hinged bottom, and thus the parts B² of the axle are kept parallel when folded.

The top, when removed, can be folded, as shown in Fig. 29.

When the two parts of the reach are fully telescoped, the head of the spring secured to the front part enters a hole, W, in the bottom C², and the two parts of the reach are thus held in this position during transportation and storage.

When the vehicle is to be changed from a shipping to a using position, the different parts are lengthened out, adjusted, and put together, as described.

I claim as my invention—

1. A longitudinally and transversely divided child's carriage, hinged to fold together sidewise, the forward part telescoping into the rear part, as set forth.

2. In a child's carriage, the combination of the top, body, handle, and axles, all divided longitudinally and hinged together, as shown, the body, reach, and side bars all divided transversely, and the forward parts telescoping into the rear parts, as shown, and means for drawing the parts together simultaneously, as set forth.

3. A longitudinally and transversely divided child's carriage, the rear part of the body folding outward, the front part of the body folding inward, the top folding upward, the handle folding downward, the bottom of the rear part of the body folding upward, the axles folding rearwardly, and the front portions of the body, reach, and side bars telescoping into their rear portions, as set forth.

4. In a child's carriage, the body divided transversely and longitudinally, the divided ends being hinged together and to the sides, and the front part telescoping with the rear part, as set forth.

5. In a child's carriage, the body longitudinally and transversely divided, the transversely-divided parts sliding one in the other, and the bottom of the rear part being hinged to the sides of the body, and the bottom of the front part removable, as set forth.

6. A child's carriage having a folding top secured to its supporting-braces by spring-catches, substantially as and for the purpose set forth.

7. A child's carriage having its reach made in two parts, one of which is adapted to telescope the other, in combination with sectional axles, as and for the purpose set forth.

8. A child's carriage having its reach made in two parts, the front part adapted to telescope the other, which has a pivoted bottom with which the front part comes in contact and moves it back, substantially as and for the purpose set forth, in combination with the sectional axles, as described.

9. A child's carriage having its reach made in two parts, one secured to the front and the other to the rear axle, the former adapted to telescope the latter, and the latter having a hinged bottom adapted to have end movement, and to be moved endwise by the forward part of the reach, for the purpose set forth, in combination with the sectional axles, the rear axle having a pin adapted to come in contact with and raise the rear end of the pivoted bottom of the rear part of the reach, substantially as shown and described, for the purpose mentioned.

10. A child's carriage having a two-part reach, one of which is adapted to telescope the other, in combination with the spring secured to one part and adapted to engage in a hole in the other part to hold the two parts in their shipping position, substantially as set forth.

11. In a child's carriage, the combination of a sectional reach and sectional side bars, and the side bars having racks secured thereto, which are engaged by gearing connecting them with the rear wheels of the carriage, for the purpose set forth.

12. In a child's carriage, the combination of sectional reach and sectional side bars, the side bars having flexible racks secured thereto, which are engaged by gearing connecting them with the rear wheels of the carriage, for the purpose set forth.

13. In a child's carriage, the combination, with the sectional side bars and reach, and racks secured to the side bars, of the gearing engaging with the racks, and adapted to be held in or out of engagement with the rear wheels of the carriage by suitable pivoted dogs, substantially as and for the purpose set forth.

THOS. McKNIGHT.

In presence of—
SAML. KNIGHT,
GEO. H. KNIGHT.